US008386221B2

(12) United States Patent
Tognarelli et al.

(10) Patent No.: US 8,386,221 B2
(45) Date of Patent: Feb. 26, 2013

(54) METHOD FOR SUBSEA EQUIPMENT SUBJECT TO HYDROGEN INDUCED STRESS CRACKING

(75) Inventors: Leonardo Tognarelli, Florence (IT); Paolo Di Sisto, Florence (IT); Michelangelo Fabbrizzi, Florence (IT); Roberto Merlo, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 387 days.

(21) Appl. No.: 12/772,289

(22) Filed: May 3, 2010

(65) Prior Publication Data

US 2011/0137616 A1   Jun. 9, 2011

Related U.S. Application Data

(60) Provisional application No. 61/267,234, filed on Dec. 7, 2009.

(51) Int. Cl.
*G06F 17/50* (2006.01)
*G06F 7/60* (2006.01)
*G06G 7/48* (2006.01)
*G06G 7/56* (2006.01)
*G06G 7/50* (2006.01)

(52) U.S. Cl. ............ 703/6; 703/1; 703/2; 703/7; 703/8; 703/9; 703/10; 703/11; 703/12

(58) Field of Classification Search .......... 703/1, 2, 703/6–12
See application file for complete search history.

(56) References Cited

U.S. PATENT DOCUMENTS

| 5,188,805 | A | * | 2/1993 | Sabottke | 422/111 |
|---|---|---|---|---|---|
| 5,648,919 | A | * | 7/1997 | Yamauchi et al. | 703/6 |
| 5,728,943 | A | * | 3/1998 | Colter et al. | 73/799 |
| 5,736,645 | A |   | 4/1998 | Chin-Chan et al. | |
| 5,920,491 | A | * | 7/1999 | Hibbitt et al. | 703/7 |
| 6,606,910 | B1 | * | 8/2003 | Nishimura et al. | 73/627 |
| 6,941,254 | B2 | * | 9/2005 | Duret et al. | 703/9 |
| 6,948,563 | B2 | * | 9/2005 | Wellington et al. | 166/302 |
| 7,003,439 | B2 | * | 2/2006 | Aldred et al. | 703/10 |
| 7,013,249 | B1 | * | 3/2006 | Davis | 703/7 |
| 7,043,373 | B2 | * | 5/2006 | Pittalwala et al. | 702/34 |
| 7,088,640 | B2 | * | 8/2006 | Alliot | 367/124 |
| 7,126,338 | B2 | * | 10/2006 | MacGregor et al. | 324/334 |
| 7,177,787 | B2 | * | 2/2007 | Rey-Fabret et al. | 703/9 |
| 7,181,980 | B2 | * | 2/2007 | Wium | 73/861.04 |
| 7,231,331 | B2 | * | 6/2007 | Davis | 703/2 |
| 7,250,606 | B2 | * | 7/2007 | Ogura et al. | 250/358.1 |
| 7,500,494 | B2 | * | 3/2009 | Robinson et al. | 138/99 |
| 7,539,625 | B2 | * | 5/2009 | Klumpen et al. | 705/7.22 |
| 7,542,885 | B1 | * | 6/2009 | Majumdar | 703/2 |
| 7,546,224 | B2 | * | 6/2009 | Campbell | 703/1 |
| 7,546,884 | B2 | * | 6/2009 | Veeningen et al. | 175/40 |
| 7,548,873 | B2 | * | 6/2009 | Veeningen et al. | 705/7.12 |

(Continued)

FOREIGN PATENT DOCUMENTS

EP    0661538 A2    7/1995
JP    11023565 A    1/1999

OTHER PUBLICATIONS

Veritas et al. "Structural Analysis of Piping Systems", 2008.*

(Continued)

*Primary Examiner* — Shambhavi Patel
(74) *Attorney, Agent, or Firm* — Potomac Patent Group PLLC (57) ABSTRACT

Systems and methods for generating transfer functions associated with calculating local stresses on pipe elements by post processing forces and moments of a pipe model representing the piping system. The transfer functions are reusable and allow recalculation with different sets of user data without requiring regeneration of the transfer functions.

13 Claims, 9 Drawing Sheets

U.S. PATENT DOCUMENTS

| | | | |
|---|---|---|---|
| 7,630,914 B2* | 12/2009 | Veeningen et al. | 705/7.28 |
| 7,698,110 B2* | 4/2010 | Connor et al. | 703/1 |
| 8,177,305 B2* | 5/2012 | Burns et al. | 299/2 |
| 8,220,539 B2* | 7/2012 | Vinegar et al. | 166/247 |
| 8,261,832 B2* | 9/2012 | Ryan | 166/303 |
| 8,267,170 B2* | 9/2012 | Fowler et al. | 166/245 |
| 8,267,185 B2* | 9/2012 | Ocampos et al. | 166/387 |
| 2003/0171879 A1* | 9/2003 | Pittalwala et al. | 702/34 |
| 2004/0243321 A1* | 12/2004 | Pittalwala et al. | 702/34 |
| 2005/0209836 A1* | 9/2005 | Klumpen et al. | 703/10 |
| 2005/0216242 A1* | 9/2005 | Flax et al. | 703/9 |
| 2006/0065320 A1 | 3/2006 | Borland et al. | |
| 2006/0250894 A1* | 11/2006 | Alliot | 367/96 |
| 2006/0284417 A1* | 12/2006 | Brown | 285/288.8 |
| 2007/0150201 A1* | 6/2007 | Eidesmo et al. | 702/13 |
| 2009/0145598 A1* | 6/2009 | Symington et al. | 166/250.01 |
| 2010/0147047 A1* | 6/2010 | Kerdiles et al. | 72/367.1 |
| 2010/0147409 A1* | 6/2010 | Lu et al. | 138/99 |
| 2010/0174516 A1* | 7/2010 | Nikolayev et al. | 703/9 |
| 2010/0224365 A1* | 9/2010 | Abad | 166/275 |
| 2010/0294383 A1* | 11/2010 | Melbo et al. | 137/551 |
| 2010/0299119 A1* | 11/2010 | Erikson et al. | 703/6 |
| 2010/0299122 A1* | 11/2010 | Golinveaux et al. | 703/9 |

OTHER PUBLICATIONS

Xu et al. "Finite element analysis of burst pressure of composite hydrogen storage vessels", Materials and Design 30 (2009) 2295-2301.*

Viyanit, Ekkarut. "Numerical Simulation of Hydrogen Assisted Cracking in Supermartensitic Stainless Steel Welds", 2005.*

Adams et al. "Evaluation of Natural Gas Pipeline Materials for Hydrogen/Mixed Hydrogen-Natural Gas Service", 2005.*

Sheremetov et al. "Knowledge-based collaborative engineering of pipe networks in the upstream and downstream petroleum industry", Computers in Industry 59 (2008) 936-948.*

Alvarado et al. "Decision-making on pipe stress analysis enabled by knowledge-based systems", Knowl Inf Syst (2007) 12(2):255-278.*

Fabbrizzi, M., et al., "Draf: A Method for Verification of Subsea Equipment Subject to Hydrogen Induced Stress Cracking," Proceedings of the ASME 2010 29th International Conference on Ocean, Offshore and Arctic Engineering, OMAE2010, Jun. 6-11, 2010, Shangai, China, pp. 1-10.

PCT Search Report and Written Opinion issued Nov. 8, 2011 in Application No. PCT/EP2010/068336.

* cited by examiner

METHOD FOR SUBSEA EQUIPMENT SUBJECT TO HYDROGEN INDUCED STRESS CRACKING

RELATED APPLICATION

This application is related to, and claims priority from, U.S. Provisional Patent Application Ser. No. 61/267,234, entitled "Design Method for Subsea Equipment Subject to Hydrogen Induced Stress Cracking", filed on Dec. 7, 2009, the disclosure of which is incorporated here by reference.

TECHNICAL FIELD

The present invention relates generally to subsea equipment piping design and, more specifically, to designing subsea piping systems subject to Hydrogen Induced Stress Cracking (HISC).

BACKGROUND

The world's use of fossil fuels has grown exponentially over the past several decades. With this growth, the oil and gas industry has broadened the search for new oil and gas reserves to meet the ever growing consumer demand. The search for new oil and gas reserves now includes areas previously unimaginable for exploration. The need to produce oil and gas from these new regions has presented a new set of problems related to the design and validation of equipment used in the production of the newly discovered oil and gas reserves.

Some of the new areas which are producing substantial oil and gas reserves are located beneath the ocean. In the subsea environment, new problems associated with flow line and production equipment have produced a new class of equipment design problems which are sometimes referred to as "Hydrogen Induced Stress Cracking" (HISC). In general, HISC problems are created by two environmental factors, specifically the availability of ionic hydrogen at the surface of chromium alloyed steel constructed subsea equipment due to such equipments' immersion in an aqueous solution.

The result of such HISC related problems is manifested by a weakening of the alloyed steel components and structures. Subsequent component and/or structural failure can occur leading to safety issues, environmental damage by contamination to the surrounding subsea location and high repair costs based on equipment location. Analysis of failed subsea systems has indicated that consideration of HISC factors should be included in the overall design process associated with subsea systems which are made of certain materials (e.g. Duplex and Super Duplex Stainless Steel) used in the acquisition and recovery of subsea reserves of oil and gas.

Current methods for analyzing and designing subsea oil and gas production systems, while capable of allowing for HISC considerations, require many hours of computer computational time to complete an analysis of one set of conditions. For example, in a first design/evaluation step, a one-dimensional frame model is developed with center lines representing the axis of the piping system. After the frame model is complete, the axial lines are replaced by finite pipe elements. The pipe elements are able to simulate all various types of operating and non-operating conditions and allow the assessment of ASME requirements (i.e. ASME B31.8).

In a second step, the pipe elements are partially or fully replaced by shell elements. The number of elements replaced is dependent on the sections of the design under review. Like the pipe elements, the shell elements are able to simulate both operating and non-operating conditions. However a significant feature of shell elements in the design process is that the shell elements allow for the prediction of local stresses and therefore the assessment of linear HISC (i.e. DNV RP-F112). However the many sets of load conditions and the associated sets of computational runs associated with processing the shell elements in this second step can be prohibitively expensive both in terms of time and computing requirements.

In a third step, elements identified as not compliant with required conditions based on the linear analysis of step two are replaced with three-dimensional sub-models. An analysis is performed with elasto-plastic material properties allowing the assessment of non-linear HISC conditions. The result of the three-dimensional sub-model analysis allows for the prediction of local strains on the analyzed elements.

Accordingly, market pressure is demanding a method for designing subsea oil and gas equipment capable of withstanding the rigors of the subsea environment without the prohibitively expensive costs, in terms of analysis time and computational requirements, of existing techniques.

SUMMARY

Exemplary embodiments relate to systems and methods for analyzing and designing subsea components and systems for oil and gas recovery capable of withstanding the subsea environment and the problems associated with HISC. The methodology includes the development of Transfer Functions (TF) for each type of pipe element. For example, transfer functions can be developed for bends, tees, couplings, welds and the like which are associated with subsea piping.

According to an exemplary embodiment, the data collected from the first step of the current methodology is provided to the appropriate TF. The appropriate transfer function is based on the pipe element under investigation. The TF transforms the collected pipe data into local stresses associated with the pipe element for the user specified conditions of the analysis. However, it will be appreciated by those skilled in the art that such advantages are not to be construed as limitations of the present invention except to the extent that they are explicitly recited in one or more of the appended claims.

According to another exemplary embodiment, a series of simulations can be performed on the subject pipe element using different conditions without developing a new transfer function for each set of conditions. The results of the series of simulations creates a profile of the local stresses, based on the different conditions, allowing a more accurate and reliable design of the associated pipe element. Any pipe element determined to be non-compliant with the linear HISC analysis provided by the TF can then be analyzed by the previously described third step of the existing HISC analysis. The elimination of the time and resource intensive second step of the existing HISC analysis provides for designing a subsea oil and gas system capable of withstanding the conditions of the subsea environment while providing an economical and timely analysis and design phase as demanded by current industry and market requirements.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1:
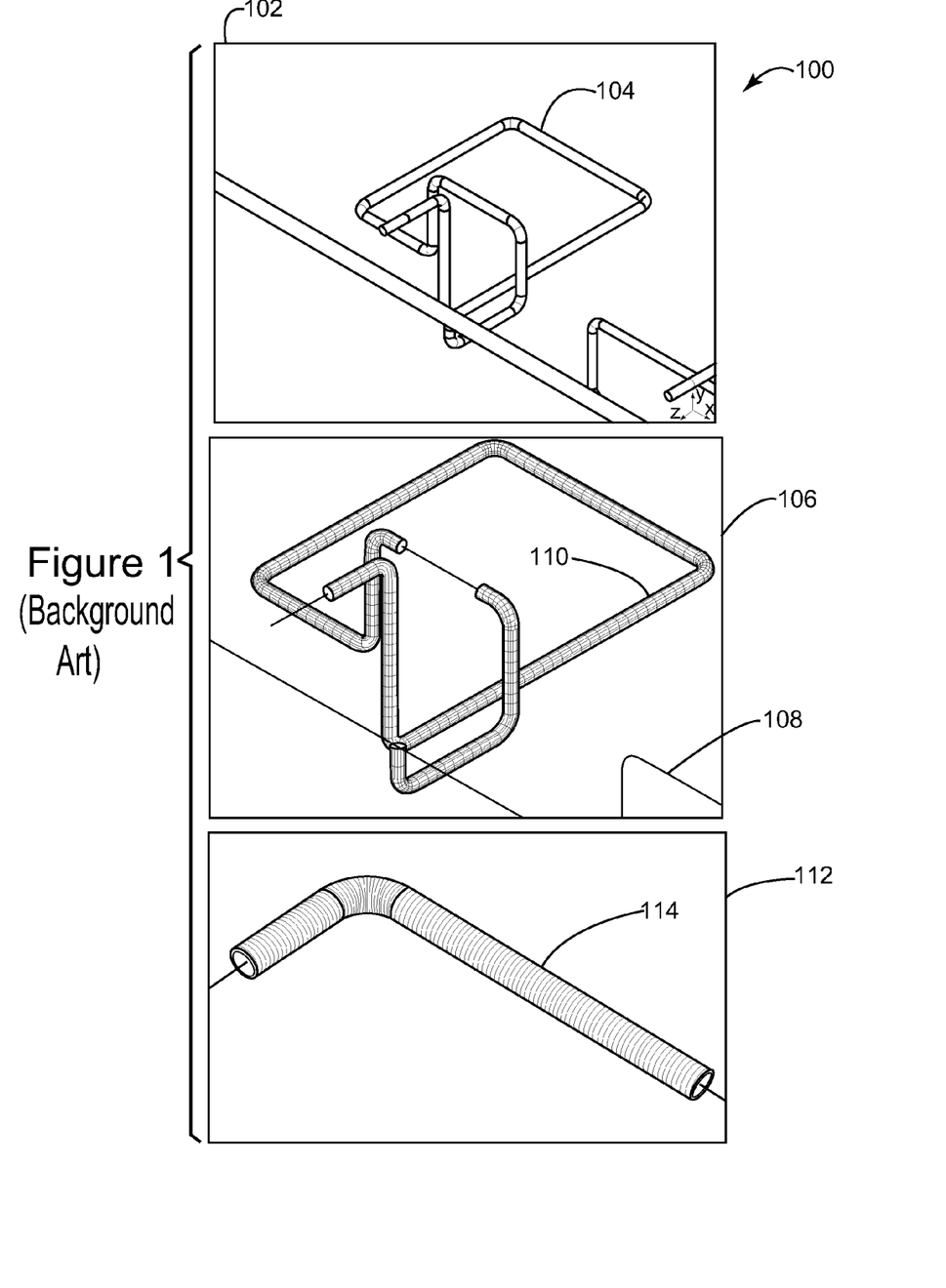
FIG. 1 depicts system models representing the three different simulations associated with the background art.

To provide context for the subsequent discussion relating to transfer function generation and the use of the generated transfer functions in HISC assessment systems according to these exemplary embodiments, FIG. 1 schematically illustrates piping models associated with the current method of system design. As discussed previously, the method uses three modeling systems illustrated by system 100 and is comprised of three steps. In a first step, a frame model of the piping system is constructed with piping lines 108 coinciding with the axis of the three-dimensional pipes. After constructing the frame model, the lines are replaced with pipe elements 104 representing the piping system and providing data (area, inertia, etc.) associated with the desired piping system. The result of the first step is the production of a pipe model 102.

Next, in a second step, the pipe model produced by the first step is fully or partially replaced by shell elements 110. The resultant shell model 106 can simulate operating, incidental and stroke conditions allowing the assessment of linear HISC conditions. The driving force behind this model is the prediction of local stresses of the pipe elements.

Proceeding to the third step, a determination is made for each pipe element to determine if the linear HISC assessment is compliant. If it is determined that a particular pipe element is non-compliant with the linear HISC assessment then a three-dimensional sub-model 112 is generated for the pipe element 114. The three dimensional sub-model 112 is then run with elasto-plastic material properties, developing a non-liner HISC assessment. After running the three-dimensional sub-model 112, a determination is made regarding the acceptability of the pipe element based on its current design.

Figure 2:
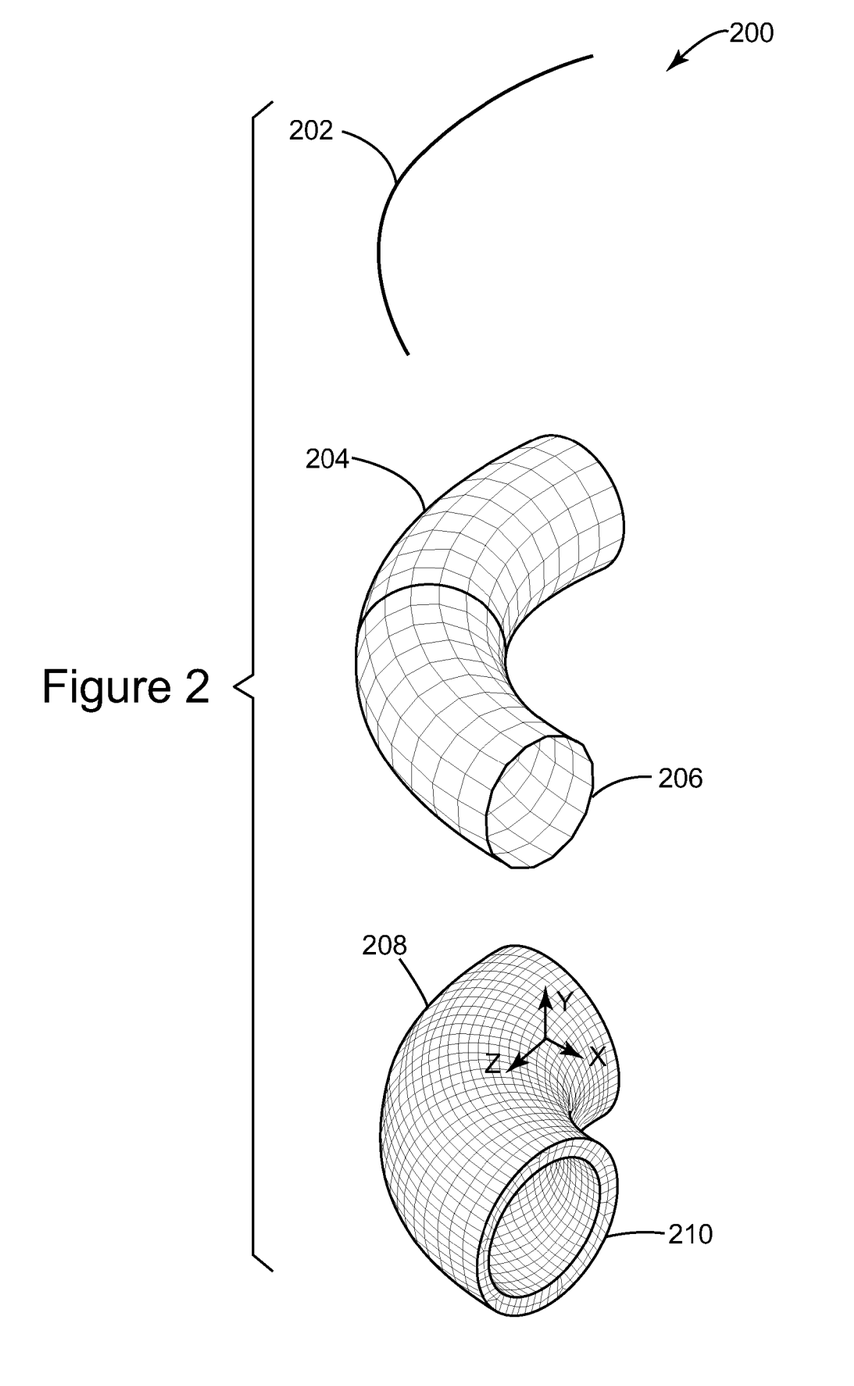
FIG. 2 depicts a pipe with a ninety degree bend to illustrate the amount of FEM elements required in the three different types of simulations.

Looking now to FIG. 2 and another exemplary embodiment 200 of the current method of piping system design, representations of a bend pipe element for the three different models depicts the relative complexity of the different models. The bend with a uni-axial element 202 is the model used for the first step 102 previously described. This model requires the least amount of input data and the least amount of computational time. For example, the representative bend uni-axial element 202 has twelve degrees of freedom, six for each element end.

The bend pipe element 204 with a shell elements 206 is a more complex model with each shell element 206 having twenty-four degrees of freedom. The shell elements 206 are pieced together to represent the surface of the bend pipe element 204 and require many more calculations per shell element 206 in addition to the many shell elements 206 required to represent the surface of the bend pipe element 204. The three-dimensional sub-model 208 with solid elements 210 is the most complex model because it models the entire structure of the bend. The solid elements 210 and the shell elements 206 have similar degrees of freedom and therefore computational complexities but the three-dimensional sub-model 208 requires many more solid elements to define the structure. Accordingly, the computational times required for a solid element modeled bend is much greater than the computational time required for a shell element modeled bend. However, in the current design method the second step 106 shell modeling is conducted over the entire piping system whereas the third step 112 three-dimensional sub-modeling is applied to only pipe elements viewed as linear HISC non-compliant based on the shell model analysis.

Figure 3:
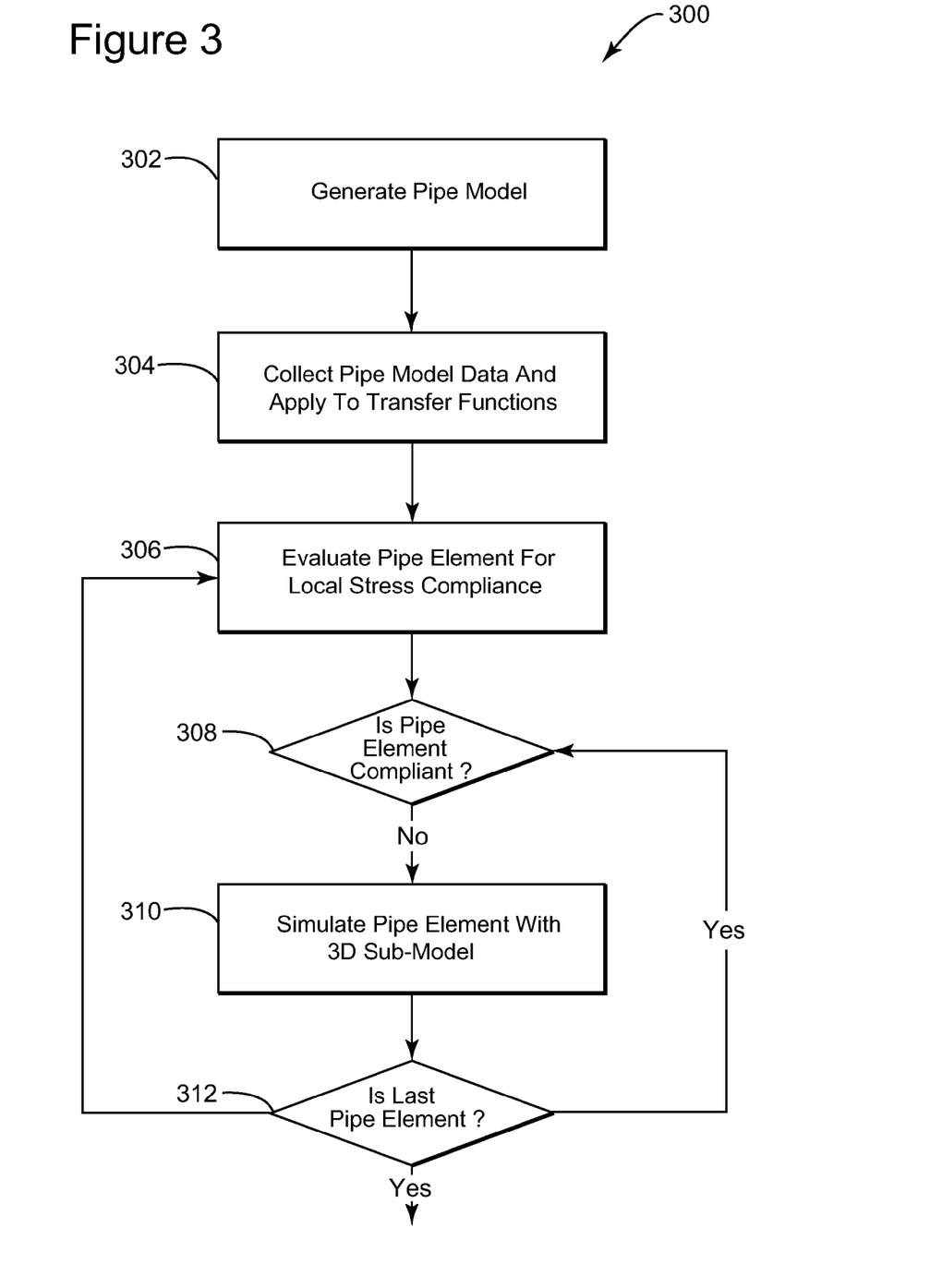
FIG. 3 depicts a method of making a HISC assessment based on a pipe model, transfer functions and a three dimensional sub-model according to an exemplary embodiment.

Referring now to FIG. 3, a method 300 of making a HISC assessment based on a pipe model, transfer functions and three-dimensional sub-model according to an exemplary embodiment is illustrated. Beginning at step 302, a pipe model is generated representing the piping system. A frame model is first constructed of lines representing the axis of the pipes in the system. Next, the frame lines are replaced by their corresponding pipe elements. Each pipe element provides the associated real data such as area, inertia and the like representing the actual piping system configuration.

Next at step 304, the pipe model results for each pipe element are collected and presented to the transfer function associated with the pipe element. The transfer function calculates predictions for the local stresses of the elements by post-processing forces and moments of the pipe model. The manner in which such transfer functions can be determined according to exemplary embodiments is described below. Next at step 306, the calculated local stress values are evaluated for linear HISC compliance. Compliance is determined by comparing the calculated local stress values to standard engineering tolerances. In particular, the linear compliance is assessed by listing, for each component: 1) the maximum membrane stress in the principal directions, 2) the maximum membrane plus bending stresses in the principal directions and 3) Von Mises [eqv.] with just membrane plus bending stresses.

Continuing to step 308, a determination is made of whether the pipe element is linear stress compliant. If the pipe element is not linear stress compliant then the method 300 proceeds to step 310. At step 310 the method simulates the pipe element with a three-dimensional sub-model. The three-dimensional sub-model performs a non-linear HISC assessment by predicting local strains on the pipe element. If the pipe element is non-compliant with the non-linear HISC assessment then a redesign of the pipe element is required. If the pipe element is compliant with the non-linear HISC assessment then the method 300 continues to step 312 and a determination is made as to whether any other pipe elements require evaluation. If additional pipe elements require evaluation then the method 300 returns to step 306 and repeats with the next pipe element. For example, the non-linear HISC compliance is assessed in a course and, if required, fine evaluation. According to an exemplary embodiment, the previously described evaluation is performed just for those pipe elements for which predicted strains are not sufficiently below HISC limits. The method according to this exemplary embodiment provides results inside and outside of five percent of wall thickness and generates strain plots versus wall thickness, however those skilled in the art will appreciate that other limits may be used. The plots are automatically generated for any sections where stress concentrates. In another aspect of this exemplary embodiment, plots are also generated at regularly spaced sections from the bend end section.

Figure 4:
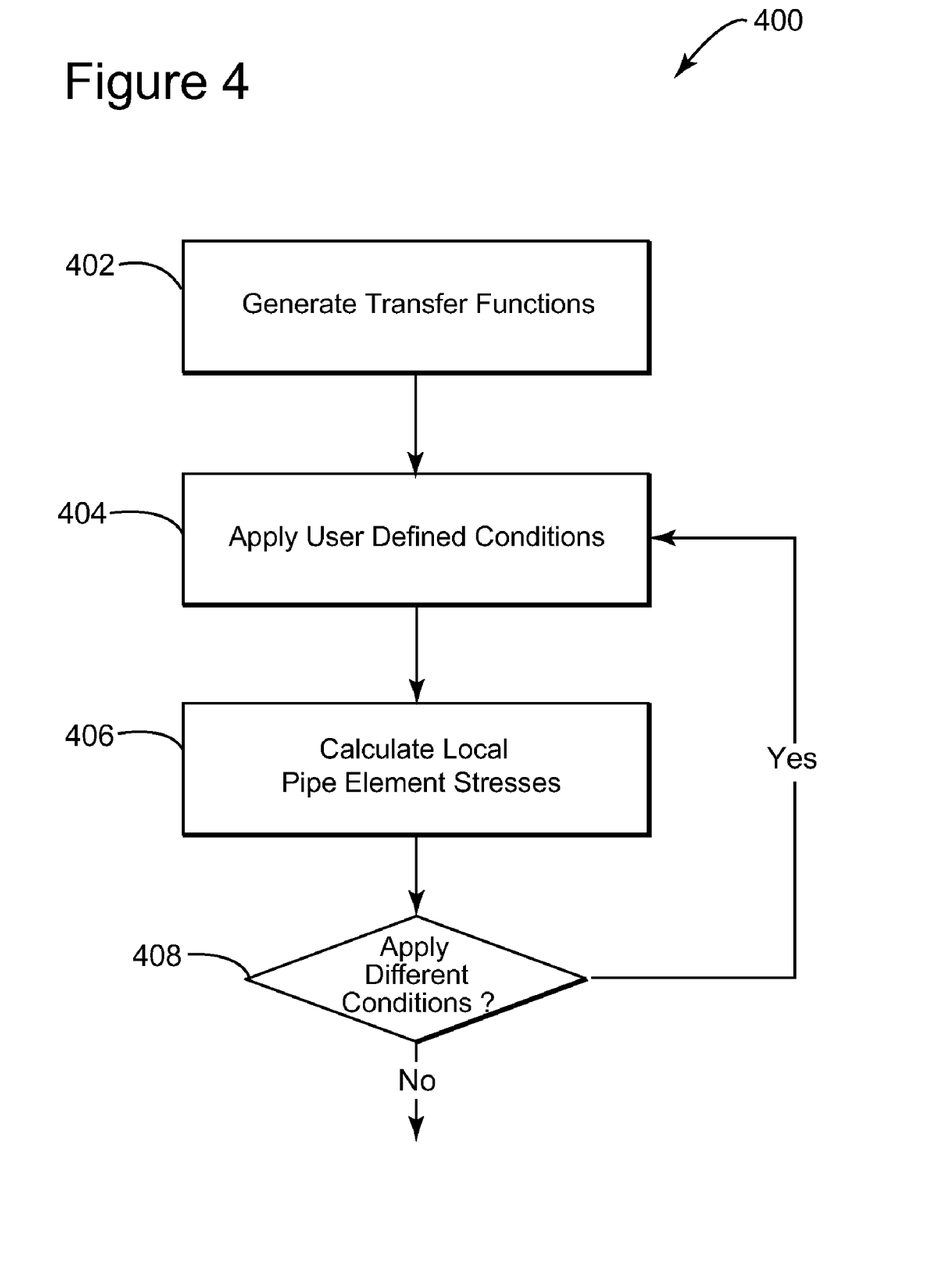
FIG. 4 depicts a method of generating transfer functions and making a HISC assessment based on a series of user defined conditions according to an exemplary embodiment.

Looking now to FIG. 4, a method 400 of generating transfer functions and using the transfer functions for repetitive calculations using different user defined conditions without generating new transfer functions according to an exemplary embodiment is illustrated. Beginning at step 402, the method generates transfer functions by running a set of combinations of the pipe element dimensions for each type of load applicable to the pipe element. Next, at step 404, user defined conditions are provided to the transfer function as inputs. Continuing to step 406, the transfer functions are exercised and the local pipe element stresses calculated by the transfer functions are collected.

Next at step 408, a determination is made regarding additional calculations with a different set of user defined conditions. If additional transformations are required using another set of user defined conditions then the method returns to step 404 and repeats the transformation without generating new transfer functions based on the updated user defined conditions. It should be noted that an optimization point of the method according to this exemplary embodiment is the ability to calculate local pipe element stresses for different user defined conditions without the need to generate new transfer functions based on the new user defined conditions.

Figure 5:
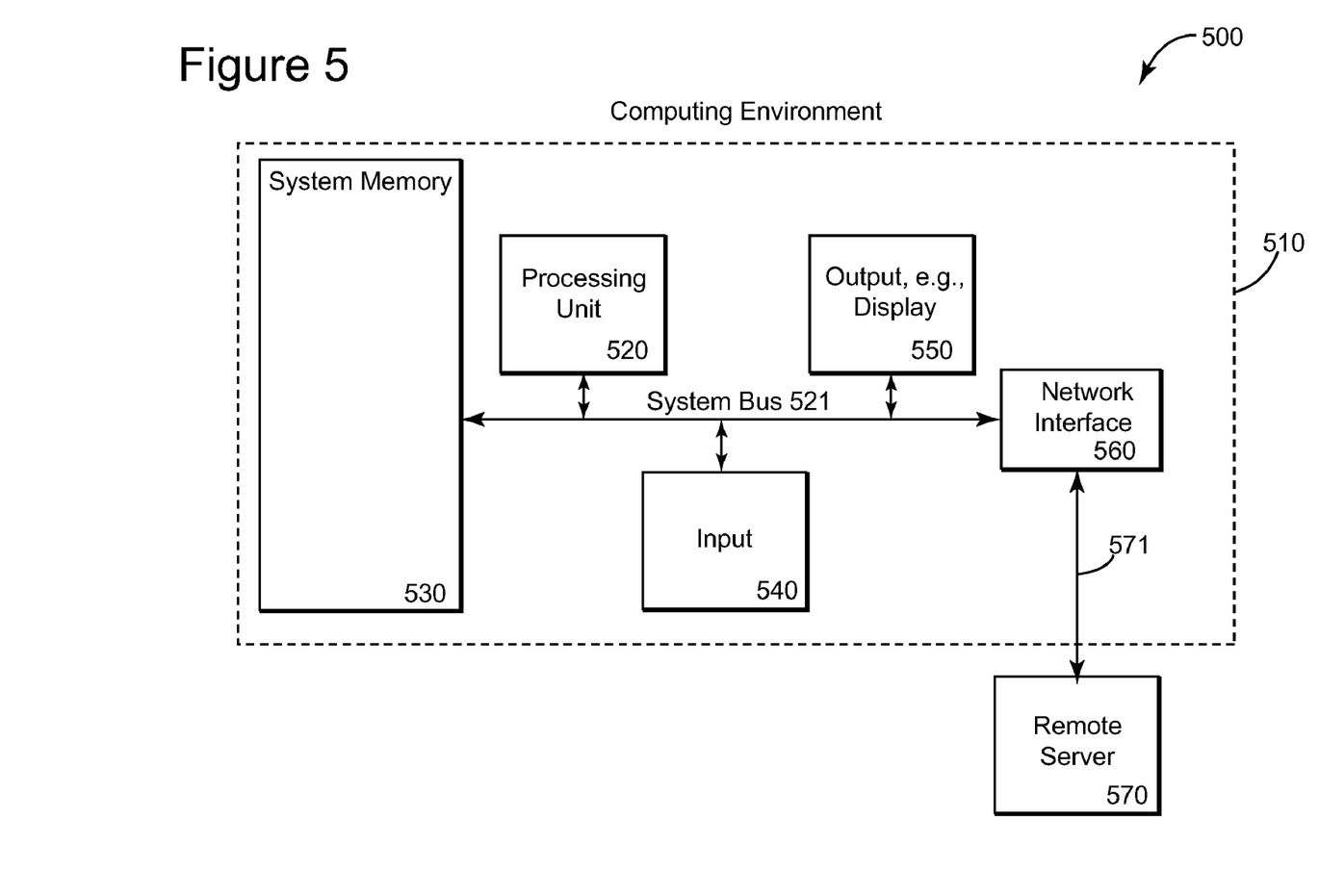
FIG. 5 depicts a general computing environment for performing the calculations associated with generating transfer functions and making a HISC assessment according to an exemplary embodiment.

Referring now to FIG. 5, illustrated therein is an example of a suitable computing system environment 500 in which the claimed subject matter can be implemented. It should be noted that the computing system environment 500 is only one example of a suitable computing environment for a mobile device and is not intended to suggest any limitation as to the scope of use or functionality of the claimed subject matter. Further, the computing environment 500 is not intended to suggest any dependency or requirement relating to the claimed subject matter with respect to any one, or any combination, of the components illustrated in the exemplary operating environment 500.

With reference to FIG. 5, an example of a remote device for implementing the various aspects described herein includes a general purpose computing device in the form of a computer 510. Components of computer 510 can include, but are not limited to, a processing unit 520, a system memory 530, and a system bus 521 that couples various system components including the system memory 530 to the processing unit 520. The system bus 521 can be any of several types of bus structures including a memory bus or memory controller, a peripheral bus, and a local bus using any of a variety of bus architectures.

Computer 510 can include a variety of computer readable media. Computer readable media can be any available media that can be accessed by computer 510. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media can embody computer readable instructions, data structures, program modules or other data in a modulated data signal such as a carrier wave or other transport mechanism and can include any suitable information delivery media.

The system memory 530 can include computer storage media in the form of volatile and/or nonvolatile memory such as read only memory (ROM) and/or random access memory (RAM). A basic input/output system (BIOS), containing the basic routines that help to transfer information between elements within computer 510, such as during start-up, can be stored in memory 530. Memory 530 can also contain data and/or program modules that are immediately accessible to and/or presently being operated on by processing unit 520. By way of non-limiting example, memory 530 can also include an operating system, application programs, other program modules, and program data.

The computer 510 can also include other removable/non-removable, volatile/nonvolatile computer storage media. For example, computer 510 can include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive can be connected to the system bus 521 through a non-removable memory interface such as an interface, and a magnetic disk drive or optical disk drive can be connected to the system bus 521 by a removable memory interface, such as an interface.

A user can enter commands and information into the computer 510 through input devices such as a keyboard or a pointing device such as a mouse, trackball, touch pad, and/or other pointing device. Other input devices can include a microphone, joystick, game pad, satellite dish, scanner, or the like. These and/or other input devices can be connected to the processing unit 520 through user input 540 and associated interface(s) that are coupled to the system bus 521, but can be connected by other interface and bus structures, such as a parallel port, game port or a universal serial bus (USB). A graphics subsystem can also be connected to the system bus 521. In addition, a monitor or other type of display device can be connected to the system bus 521 via an interface, such as output interface 550, which can in turn communicate with video memory. In addition to a monitor, computers can also include other peripheral output devices, such as speakers and/or a printer, which can also be connected through output interface 550.

The computer 510 can operate in a networked or distributed environment using logical connections to one or more other remote computers, such as remote server 570, which can in turn have media capabilities different from device 510. The remote server 570 can be a personal computer, a server, a router, a network PC, a peer device or other common network node, and/or any other remote media consumption or transmission device, and can include any or all of the elements described above relative to the computer 510. The logical connections depicted in FIG. 5 include a network 571, such local area network (LAN) or a wide area network (WAN), but can also include other networks/buses. Such networking environments are commonplace in homes, offices, enterprise-wide computer networks, intranets and the Internet.

When used in a LAN networking environment, the computer 510 is connected to the LAN 571 through a network interface or adapter. When used in a WAN networking environment, the computer 510 can include a communications component, such as a modem, or other means for establishing communications over the WAN, such as the Internet. A communications component, such as a modem, which can be internal or external, can be connected to the system bus 521 via the user input interface at input 540 and/or other appropriate mechanism. In a networked environment, program modules depicted relative to the computer 510, or portions thereof, can be stored in a remote memory storage device. It should be appreciated that the network connections shown and described are exemplary and other means of establishing a communications link between the computers can be used.

Figure 6:
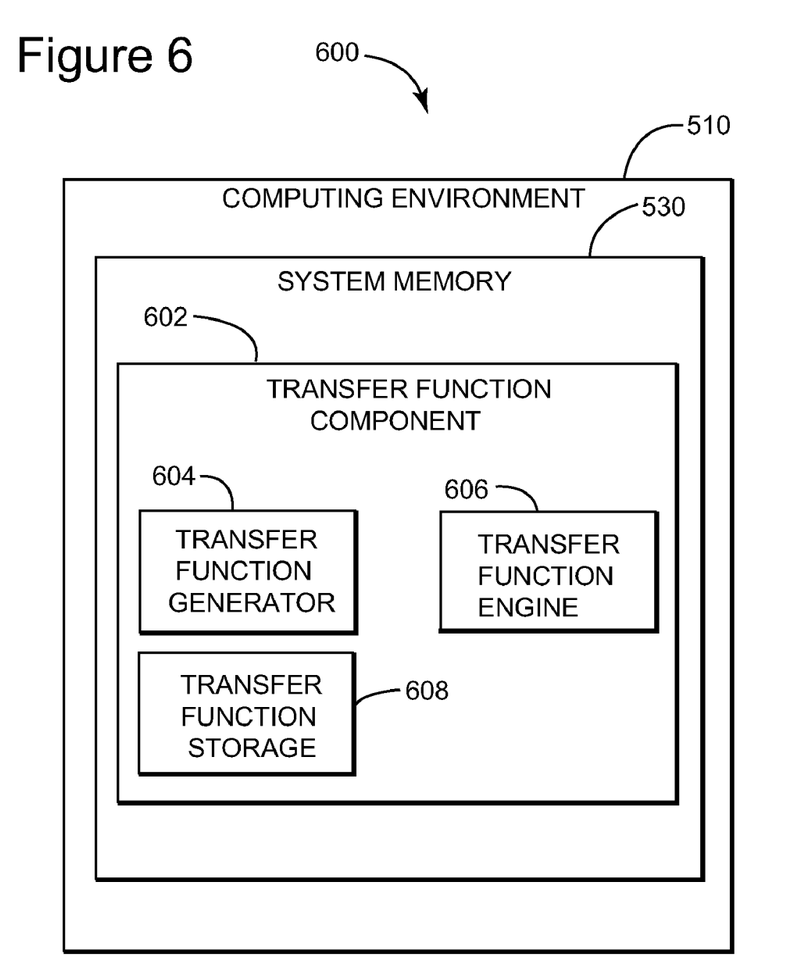
FIG. 6 depicts a transfer function component comprising a transfer function generator, a transfer function engine and transfer function storage according to an exemplary embodiment.
Figure 7:
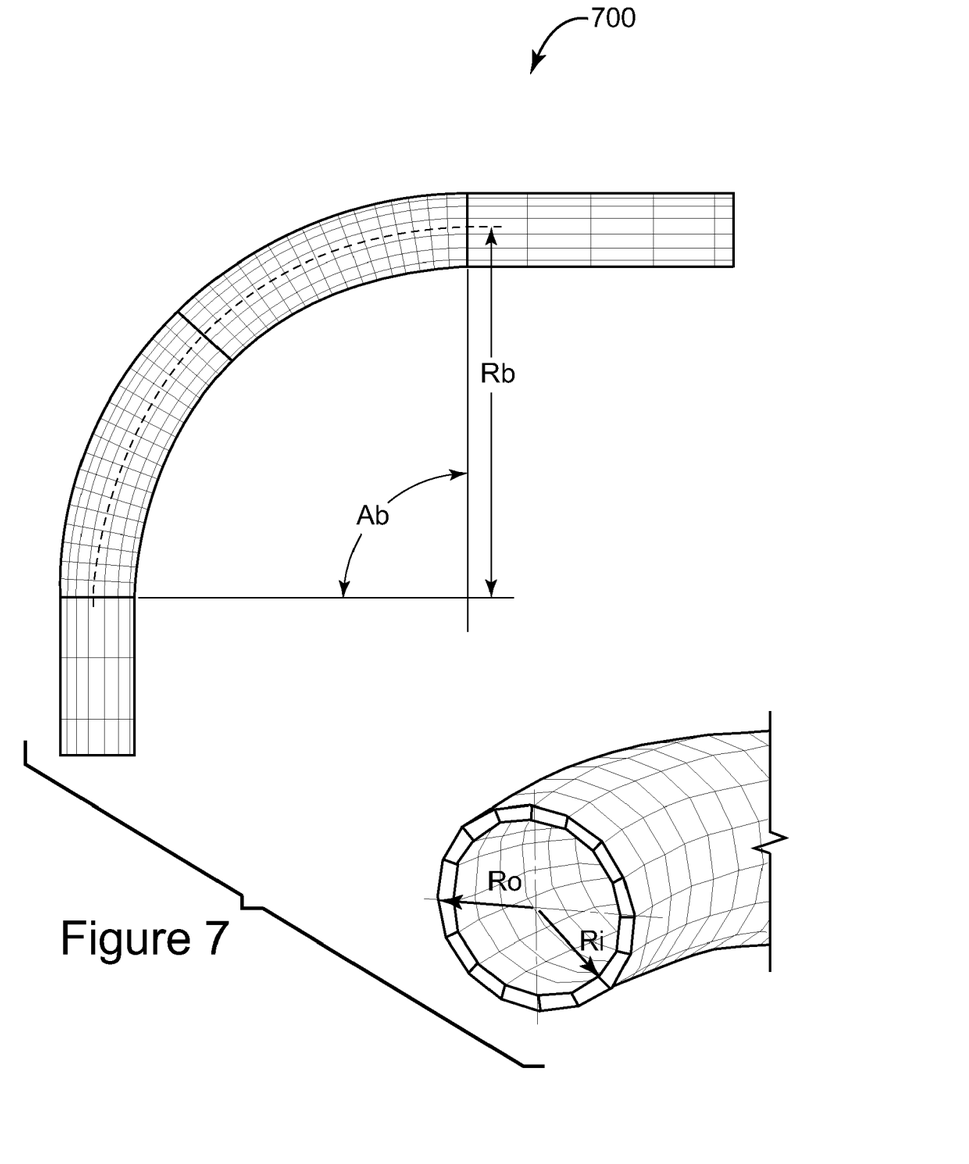
FIG. 7 depicts a bend pipe element illustrating representative independent variables associated with deriving a transfer function according to an exemplary embodiment.

Looking now to FIG. 6, a transfer function component 602 according to an exemplary embodiment comprises a transfer function generator 604, a transfer function engine 606 and transfer function storage 608. It should be noted that the transfer function component is, in this exemplary embodiment, stored in the system memory 530 of the computing environment 510 and executed by the processing unit 520 of the computing environment 510. The transfer function generator provides for the creation of transfer functions associated with pipe elements that correlate local stresses on a pipe element with loads applied to the pipe element. A second order transfer function equation for a unitary load in a specific location (node), would appear as:

$$S_{Fi} = c + (a_1 \ast Ro) + (a_2 \ast Ri) + (a_3 \ast Rb) + (a_4 \ast Ab) + \\ (a_5 \ast Ro \ast Ri) + (a_7 \ast Ro \ast Rb) + (a_8 \ast Ro \ast Ab) + \\ (a_9 \ast Ri \ast Rb) + \ldots + (a_{n+1} \ast Ro2) + (a_{n+2} \ast Rb^2) + \ldots \\ + (a_{n+5} \ast Ab^2) \quad \text{eq.1}$$

where $S_{Fi}$=Stress (S) generated by a specific force or moment (F, M) in a direction (i);

c=constant; $a_1 \ldots a_n$=coefficients, Ro=outer radius; Ri=inner radius; Ab=bend angle; and Rb=bend radius, see also the variables 700 as illustrated in FIG. 7.

Figure 8:
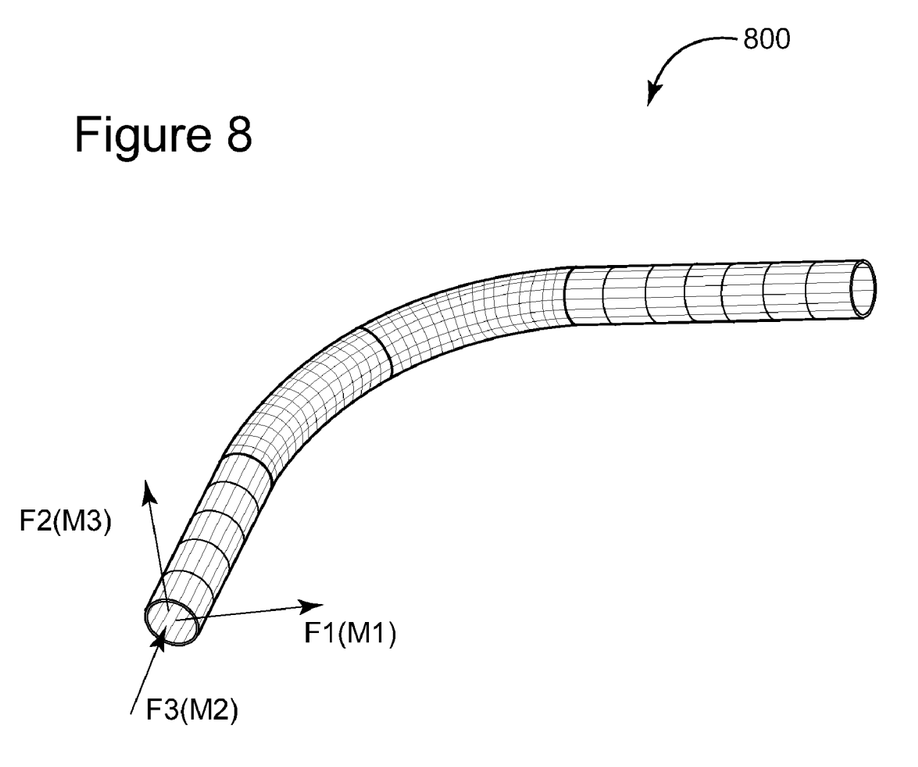
FIG. 8 depicts a bend pipe element illustrating forces and moments acting on the bend pipe element according to an exemplary embodiment.

Based on the fact that stress distribution is linearly dependent on the load, transfer functions are generated for non-unitary loads as the product of the non-unitary load at the node and the stress at the node ($S_{Fi@node} = Li \ast S_{Fi@node}$) as evaluated by eq. 1. For example, transfer functions are created for each stress component (e.g. radial stress, axial stress, hoop stress, etc.) and for each type of load with the total component stress evaluated as $$Sradial@node = L1 \ast S_{F1\_radial@node} + L2 \ast S_{F2\_radial@node} + L4 \ast S_{M1\_radial@node} \ldots + L6 \ast S_{M3\_radial@node}$$

where S=stress; L=load; F=force and M=moment, see forces/moments 800 as illustrated in FIG. 8. It should be noted that similar equations are derived for hoop stress axial stress etc. It should also be noted that according to exemplary embodiments, a transfer function is generated for each load type and, therefore, the total local stress is calculated by summing the stress values for each load type. The summation is valid because the stresses are component stresses such as hoop stress, radial stress, etc.

Figure 9:
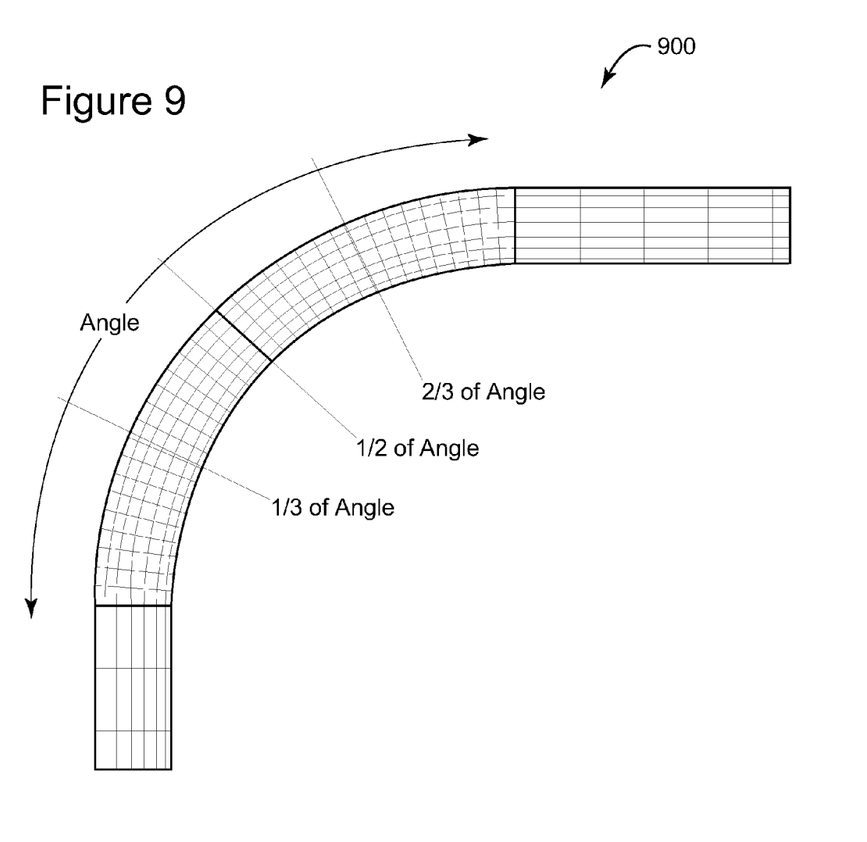
FIG. 9 depicts a bend pipe element illustrating predicted locations of maximum stress on the bend pipe element according to an exemplary embodiment.

According to one exemplary embodiment, transfer functions are generated only for nodes where stress concentrates. For example, in a bend, stress concentrates at one of the three stress locations 900 in a system under design as indicated in FIG. 9. In FIG. 9, the illustrated sections indicate the typical locations where stresses concentrate. Based on the load combination, one section will develop more stress than the others. For example, pressure stresses the ½ of ANG section while out of plane movement stresses the ⅓ of ANG section. Further, the angular position can vary based on the load combination. For the elaborated reasons, transfer functions are generated at twenty-four different angular locations. The maximum may fall between any two consecutive locations therefore a final evaluation is performed by interpolation. In total, analysis of the bend in this exemplary embodiment employs four hundred thirty-two transfer functions based on locations, force components and force types.

The transfer function engine 606 provides for executing the appropriate transfer function with the data necessary from the previously constructed pipe model to transform the structural input data into local pipe element stress values. In another exemplary embodiment, the transfer function engine 606 can loop through a series of input data collections and transform the input data to a corresponding series of pipe element local stress values. Alternatively, the local transfer function engine 606 can transmit the data collected from the pipe model to a remote transfer function engine 606, located on another computer communicatively connected to the local transfer engine function 606, for processing the input data into the pipe element local stress values. In this manner, the data processing can be accomplished on either (or both) the local computer and a remote computer.

The transfer function storage component 608 provides for storing generated transfer functions so that the transfer functions can be reused to run another simulation at a later time. In one non-limiting example, new user defined conditions can appear as a result of a change in the piping configuration and the applicable transfer functions can be recalled without the need for generating a new set of transfer functions. In another non-limiting example, the stored transfer functions can be transmitted to another computer system and stored or executed at the remote location.

As used in this application, terms such as "component", "display", "interface" and the like are intended to refer to a computer-related entity, either hardware, a combination of hardware and software, software, or software in execution as applied to a system for verification of subsea equipment subject to HISC. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user", "user", "operator" and the like are intended to refer to the person operating the computer-related entity referenced above.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. A method for assessing hydrogen induced stress cracking associated with a subsea piping system comprising: (a) determining a one-dimensional model for an element of said subsea piping system; (b) performing a one-dimensional analysis for said element using said one-dimensional model and a plurality of operating conditions to identify at least one point associated with hydrogen induced stress cracking for said element; (c) applying at least one transfer function to said at least one point to transform said at least one point from a one-dimensional representation to a local stress assessment; (d) outputting said local stress assessment; (e) analyzing said local stress assessment for a first predetermined compliance; and (d) if said local stress assessment is non-compliant then determining and running a three-dimensional sub-model for said element and analyzing output from said three-dimensional sub-model for a second predetermined compliance.

2. The method of claim 1 wherein said first predetermined compliance is a linear hydrogen induced stress cracking compliance.

3. The method of claim 1 wherein said output from said three-dimensional sub-model is a local strain assessment.

4. The method of claim 1 wherein said second predetermined compliance is a non-linear hydrogen induced stress cracking compliance.

5. The method of claim 1, wherein said element comprises, bends, tees, manifolds, couplings, welds and hubs.

6. The method of claim 1, wherein said plurality of operating conditions comprises said element area and inertia.

7. A computer-executable system stored in a memory and executing on a processor for verifying subsea piping systems are compliant with hydrogen induced stress cracking assessments, the system comprising: (a) a transfer function generator component for creating transfer functions; (b) a transfer function engine component for executing said transfer functions; (c) a transfer function storage component for archiving said transfer functions; (d) determining a one-dimensional model for an element of said subsea piping system; (e) performing a one-dimensional analysis for said element using said one-dimensional model and a plurality of operating conditions to identify at least one point associated with hydrogen induced stress cracking for said element; (f) applying at least one transfer function to said at least one point to transform said at least one point from a one-dimensional representation to a local stress assessment; (g) outputting said local stress assessment; (e) analyzing said local stress assessment for a first predetermined compliance; and (f) if said local stress assessment is non-compliant then determining and running a three-dimensional sub-model for said element and analyzing output from said three-dimensional sub-model for a second predetermined compliance.

8. The system of claim 7 wherein said transfer function engine component and said transfer function storage component are located on different computers.

9. The system of claim 7, wherein said transfer function engine component transmits input data to a second transfer function engine component, located on a separate computer system, for transforming said input data into pipe element local stress values.

10. The system of claim 7 wherein said first predetermined compliance is a linear hydrogen induced stress cracking compliance.

11. The systems of claim 7 wherein said output from said three-dimensional sub-model is a local strain assessment.

12. The system of claim 7 wherein said second predetermined compliance is a non-linear hydrogen induced stress cracking compliance.

13. The system of claim 7, wherein said element comprises, bends, tees, manifolds, couplings, welds and hubs.

\* \* \* \* \*